United States Patent [19]

Fieser et al.

[11] 4,254,942
[45] Mar. 10, 1981

[54] SCARFING TORCH

[75] Inventors: Arthur H. Fieser, Wexford; Charles H. Anderson, Jr., McMurray, Both of Pa.

[73] Assignee: A. F. Industries, Inc., Pittsburgh, Pa.

[21] Appl. No.: 40,414

[22] Filed: May 18, 1979

[51] Int. Cl.³ ............................................. B23K 7/06
[52] U.S. Cl. ...................................... 266/51; 266/66; 266/74
[58] Field of Search ...................... 266/51, 52, 53, 66, 266/74

[56] References Cited

U.S. PATENT DOCUMENTS

| | | | |
|---|---|---|---|
| 932,740 | 8/1909 | Wiss | 266/66 |
| 2,521,669 | 9/1950 | Rountree | 266/74 |
| 2,574,100 | 11/1951 | Gettys et al. | 266/74 |
| 3,829,072 | 8/1974 | Fieser et al. | 266/51 |
| 3,862,749 | 1/1975 | Fieser et al. | 148/9.5 |
| 3,926,544 | 12/1975 | Thorpe | 266/51 |

*Primary Examiner*—L. Dewayne Rutledge
*Assistant Examiner*—John P. Sheehan
*Attorney, Agent, or Firm*—Robert D. Yeager

[57] ABSTRACT

A scarfing torch adapted for manual manipulation which includes means disposed in said torch to provide a component of force upon the torch to offset forces upon the torch generated either by the flow of oxygen gas used in the scarfing process or gravity. The offsetting force is provided by the release of a secondary fluid from the torch in the appropriate direction. The secondary fluid may be released to impinge upon the surface of the workpiece being scarfed.

3 Claims, 5 Drawing Figures

SCARFING TORCH

BACKGROUND OF THE INVENTION

1. Field of the Invention

This invention relates to a torch for use in conditioning metal surfaces; more particularly to an improved scarfing torch adapted for manual manipulation.

2. Description of the Prior Art

The preparation of steel blooms, slabs and billets for further treatment often involves the removal of surface defects such as cracks, breaks, seams, checks and the like by a process known as scarfing. Scarfing consists of the application of oxygen and fuel gas to the steel surface, usually by means of a torch, to oxidize the steel and thereby generate elevated temperatures that cause the oxidized product to become liquid, which is then blown away.

Much of the present day scarfing operations are performed manually, that is by an operator holding a scarfing torch of any well-known type and directing the oxygen stream flowing from the tip of the torch against a steel surface, usually the top surface of a slab resting horizontally on the ground or suitable supports. A typical view of this operation is shown schematically in FIG. 1 of the accompanying drawings.

In a typical scarfing operation, the oxygen pressure at the torch tip may range from 40–90 p.s.i., depending upon the nozzle employed, and the oxygen flow rate may be as high as 11,000 std. ft$^3$/hr. As will be appreciated from the laws of action and reaction, such a jet exerts a considerable equal and opposite force against the torch tip, tending to move it away from the workpiece surface. Depending upon the particular orientation of the torch tip, this force may exert both vertical and horizontal forces against the operator's grip. He may, therefore, be required to exert constant downward pressure or constant sideward pressure, or both, against the torch to manipulate it in the desired manner. Such requirements lead to operator fatigue and ineffective removal of surface defects with a consequent reduction in productivity.

SUMMARY OF THE INVENTION

The present invention overcomes the disadvantages and objections associated with known scarfing torches adapted for manual manipulation. Not only is better control of the torch tip provided by the present invention, but also operator fatigue is reduced thereby affording increased productivity.

The present invention provides, in a scarfing torch adapted for manual manipulation, the torch including means for conducting oxygen gas into impingement with the surface of a steel workpiece after said surface has been heated, the improvement comprising: means disposed in the torch for releasing a secondary fluid, such as ordinary air, in a direction away from the direction of flow of the impinging oxygen gas to provide at least one component of force upon the torch that tends to offset a force acting upon the torch, such as the force generated by the flow of oxygen gas or gravity. In one embodiment of the invention, the direction of release of the secondary fluid is substantially opposite to the direction of flow of the impinging oxygen gas. In another embodiment, the secondary fluid itself is released to also impinge upon the surface of the steel workpiece. In the latter embodiment, the secondary fluid, at least in part, advantageously is also oxygen so that a burning effect is established to remove residual slag from that surface.

Other details and advantages of the present invention will become apparent from a consideration of the following detailed description taken with the accompanying drawings in which like parts are assigned the same reference numeral.

DESCRIPTION OF THE PREFERRED EMBODIMENTS

Figure 1:
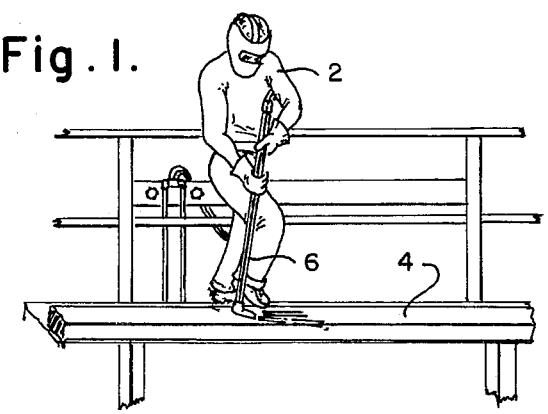
FIG. 1 is an illustration of the existing technique for performing a manual scarfing operation.

As alluded to above, FIG. 1 of the drawings illustrates a typical hand scarfing operation. An operator 2 normally stands on or immediately adjacent the workpiece to be scarfed, in this case slab 4. Operator 2 holds a conventional scarfing torch 6 by cradling the upper end in one arm and steadying the shaft portion with his other arm and leg. The technique for suppporting the torch may vary with individual operators but is generally a powerful stance to counterbalance the back thrust created by the jet of oxygen emerging from the torch tip.

Figure 2:
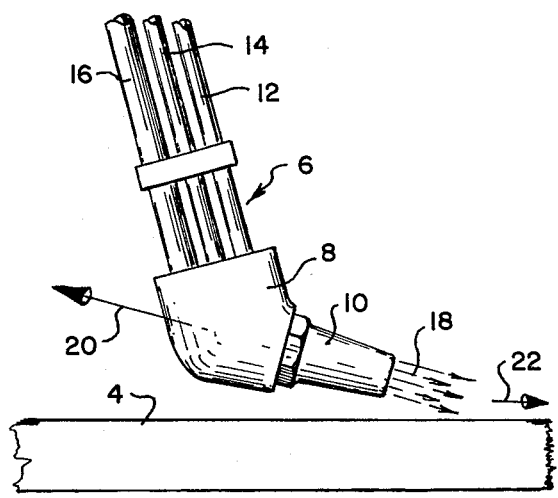
FIG. 2 is an elevational view of a conventional scarfing torch.

FIG. 2 shows a conventional scarfing torch 6 which may be modified to include the present invention. Torch 6 includes a head 8 having a tip 10 which may include a plurality of orifices (not shown) to permit streams of gases to impinge upon the surface of slab 4. The gases commonly employed in scarfing are acetylene, natural gas, or other combustible gas and oxygen; these gases are conducted to tip 10 by well-known means, shown in FIG. 2 as tubes 12, 14 and 16. When these gases emerge from tip 10 in jets illustrated by the arrows 18, a significant back thrust is created according to Newton's third law of motion; this back thrust is represented in FIG. 2 by arrow 20.

In commencing the scarfing operation, fuel gas carried by say tube 12 and oxygen carried by say tube 14 are mixed and ignited at tip 10. The heat generated by this ignition is used to preheat the surface of slab 4. Starting rods or powder may be used to generate additional heat for this purpose.

After preheating, a large flow of oxygen is conducted to tip 10 through say tube 16 and is directed against the preheated surface of slab 4 by an appropriate nozzle (not shown). Scarfing thus proceeds as described above. The direction of movement of tip 10 during the scarfing operation will be as indicated by arrow 22 in FIG. 2.

Figure 3:
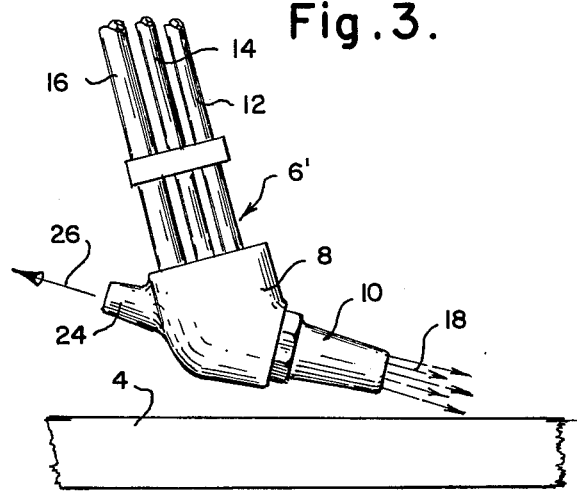
FIG. 3 is an enlarged view of a scarfing torch tip including the present invention in one embodiment.

Turning now to FIG. 3, there is shown the torch head 8 of a scarfing torch 6' embodying the present invention. Head 8 includes a rearwardly facing nozzle 24 from which a jet of secondary fluid such as ordinary air (represented by the arrow 26) is blown during scarfing operations and, in particular, during the period that the large flow of oxygen as described above is being directed against slab 4. Fluid for this purpose may be supplied to nozzle 24 by any wellknown means including an additional tube similar to tube 16. The pressure and flow rate of air jet 26 will be determined by wellknown computations involving the parameters of the gas flow from tip 10 in order to closely approximate the thrust necessary to offset the back thrust generated by the gas flow at 18. This relationship will neutralize the back thrust and enable the operator to more easily manipulate torch tip 10.

Figure 4:
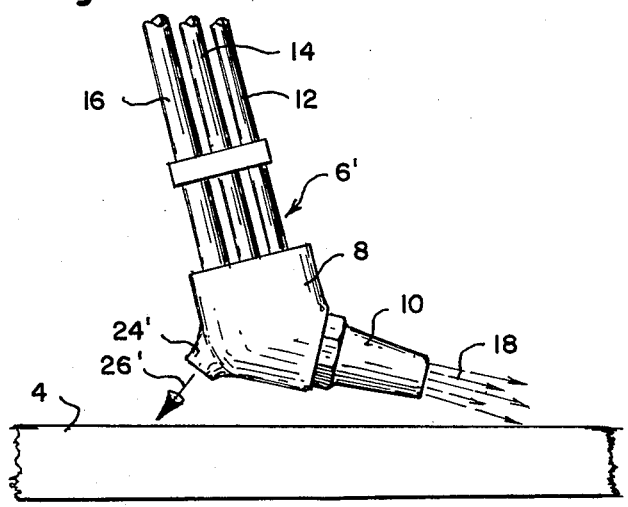
FIG. 4 is an enlarged view of a scarfing torch tip including the present invention in an alternate embodiment.

An alternate embodiment of the present invention is shown in FIG. 4. There nozzle 24' is directed at an obtuse angle from the direction of gas flow 18 instead of being substantially opposite as shown in FIG. 3. The result of this arrangement is, through the flow of secondary fluid from nozzle 24' in the direction shown by arrow 26', to partially counterbalance the back thrust created by gas flow 18 and, at the same time, to provide a vertical component of force on head 8 to partially offset the weight of torch 6'. This offset of torch weight is another convenience to the operator in manipulating torch 6'. The precise angular relationship between the direction of gas flow 18 and the axis of nozzle 24' may vary as desired between about 90 degrees (90°) and 180 degrees (180°).

The flow of fluid through nozzle 24' in the embodiment of the present invention shown in FIG. 4 has a further benefit in the scarfing operation. The impingement of fluid flowing from nozzle 24' on the surface of slab 4 has the effect of "washing" that surface and thereby aids in removing slag formed during the scarfing process. Oxygen can be used as a secondary fluid in this embodiment to provide a burning effect, in which case a second nozzle 24' optionally can be provided to carry the oxygen and thereby prevent its dilution with the other secondary fluid. The use of two nozzles 24' would thus conserve on oxygen consumption.

The secondary fluid jet 26, 26' of the present invention preferably is activated only when the large flow of oxygen referred to above is active; this can be accomplished by one of several known methods including mechanical or electrical interlocking of the secondary fluid and main oxygen lines.

Figure 5:
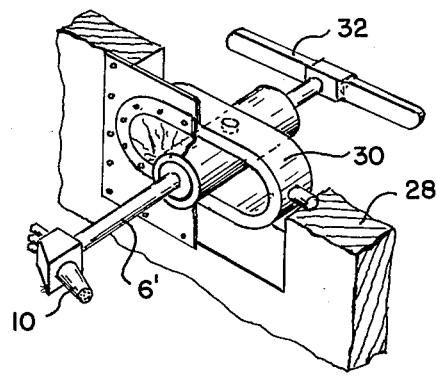
FIG. 5 is a perspective view of a mechanical mounting means for a scarfing torch, arranged to use the present invention.

In certain scarfing operations, such as those described in U.S. Pat. Nos. 3,829,072 and 3,862,749, the scarfing torch may be mechanically mounted in a work station located adjacent the workpiece to be scrafed. FIG. 5 illustrates one such mounting in which torch 6' is mounted in protective shield 28 by means of a gimball 30 which, through the actuation of appropriate cylinders by an operator manipulating handle 32, permits both in and out movement and lateral movement of torch 6'. With this arrangement, the tip 10 of torch 6' nevertheless is subjected to the back thrust described above when the large flow of oxygen is directed against the surface of the workpiece being scarfed. Accordingly, the present invention advantageously may be employed in this mechanical mounting arrangement to eliminate or reduce transmission of the back thrust to the operator through handle 32.

What is claimed is:

1. In a scarfing torch adapted for manual manipulation, said torch including means for conducting oxygen gas into impingement with the surface of a steel workpiece after said surface has been heated, said torch being acted upon by a first force generated by conduction of said oxygen gas during operation of said torch and a second force due to gravity, the improvement comprising:

means disposed in said torch for releasing a secondary fluid in a direction away from the direction of flow of said impinging oxygen gas to provide at least one component of force upon said torch that tends to offset at least one of said first and second forces acting upon said torch.

2. The improvement recited in claim 1 wherein:
the direction of release of said secondary fluid is substantially opposite to the direction of flow of said impining oxygen gas.

3. The improvement recited in claim 1 wherein:
said secondary fluid is released to impinge upon said surface of said steel workpiece.

* * * * *

UNITED STATES PATENT AND TRADEMARK OFFICE
CERTIFICATE OF CORRECTION

PATENT NO. : 4,254,942

DATED : March 10, 1981

INVENTOR(S) : Arthur H. Fieser and Charles H. Anderson, Jr.

It is certified that error appears in the above-identified patent and that said Letters Patent are hereby corrected as shown below:

Col. 1, line 13, delete "scrafing" and substitute therefor --scarfing--;

Col. 3, line 1, delete "wellknown" and substitute therefor --well-known--;

Col. 4, line 6, delete "scrafed" and substitute therefor --scarfed--;

Col. 4, line 18, delete "the" and substitute therefor --that--; and

Col. 4, line 38, delete "impining" and substitute therefor --impinging--.

Signed and Sealed this

Sixteenth Day of June 1981

[SEAL]

Attest:

RENE D. TEGTMEYER

Attesting Officer

Acting Commissioner of Patents and Trademarks